United States Patent [19]

Schymura

[11] 4,289,521
[45] Sep. 15, 1981

[54] APPARATUS FOR PRODUCING A FOAMED-GLASS OR FOAMED-CERAMIC STRIP

[75] Inventor: Konrad Schymura, Oberursel, Fed. Rep. of Germany

[73] Assignee: Metallgesellschaft Aktiengesellschaft, Frankfurt am Main, Fed. Rep. of Germany

[21] Appl. No.: 118,930

[22] Filed: Feb. 1980

[30] Foreign Application Priority Data

Feb. 24, 1979 [DE] Fed. Rep. of Germany ....... 2907363

[51] Int. Cl.³ .............................................. C03B 19/08
[52] U.S. Cl. ...................................... 65/144; 65/260; 65/361; 198/342; 198/477; 198/678; 414/155
[58] Field of Search ............ 65/22, 144, 168, 260, 65/360, 361; 414/155; 198/342, 678, 477

[56] References Cited

U.S. PATENT DOCUMENTS

| | | | |
|---|---|---|---|
| 2,401,582 | 6/1946 | Owen | 65/22 |
| 2,643,485 | 6/1953 | Edwards | 65/22 X |
| 2,843,275 | 7/1958 | Enk et al. | 414/155 |
| 2,945,605 | 7/1960 | Menough | 414/155 X |
| 3,108,677 | 10/1963 | Temple | 198/357 |
| 3,907,132 | 9/1975 | McMaster et al. | 414/155 |

FOREIGN PATENT DOCUMENTS

| | | | |
|---|---|---|---|
| 1227205 | 5/1967 | Fed. Rep. of Germany | |
| 1301009 | 8/1969 | Fed. Rep. of Germany | |
| 818606 | 9/1937 | France | |
| 899692 | 6/1945 | France | 65/22 |
| 1278522 | 10/1961 | France | |
| 1565887 | 5/1969 | France | |

OTHER PUBLICATIONS

Technologie des Glases, Butt et al., pp. 306-312, Nov. 1972.

*Primary Examiner*—Robert L. Lindsay, Jr.
*Attorney, Agent, or Firm*—Karl F. Ross

[57] ABSTRACT

An apparatus for producing a continuous strip of foamed ceramic or glass comprises a tubular furnace traversed by a plurality of molds suspended from respective trolleys or carriages and disposed in end-to-end relationship within the furnace. The molds are swung open after cooling and separated from one another as they leave the strip by being elevated at a downstream portion of the mold path.

8 Claims, 6 Drawing Figures

FIG. 5
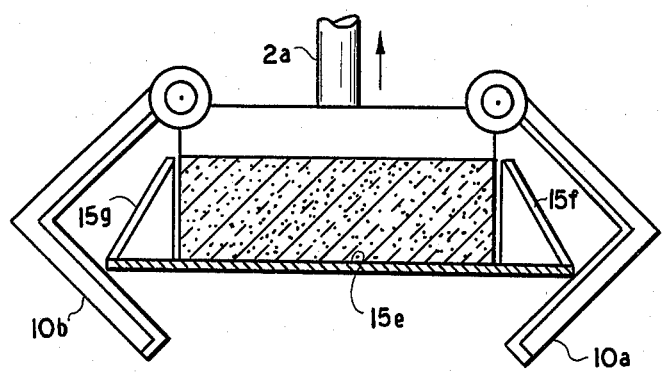
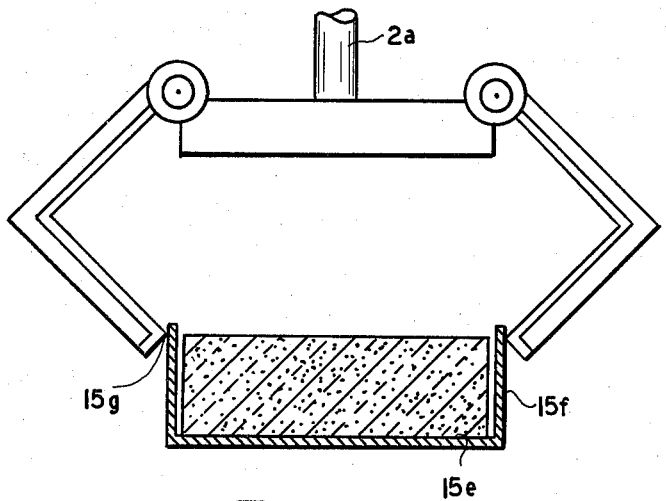
FIG. 6

APPARATUS FOR PRODUCING A FOAMED-GLASS OR FOAMED-CERAMIC STRIP

FIELD OF THE INVENTION

My present invention relates to an apparatus for producing shaped continuous foamed bodies of glass or ceramic material and, more particularly, to an apparatus for producing continuous bars of foamed glass or ceramic material.

BACKGROUND OF THE INVENTION

Rigid bodies of glass foam or foamed ceramic material are widely used in the form of blocks, bricks and the like for insulating and structural purposes because of the refractory character of the product, its low density, its comparative high strength, and its excellent thermal-insulation characteristics.

Such materials can be produced by cutting a strip or bar of glass foam or ceramic foam, into discrete blocks, the blocks being thermally treated.

It thus is of interest to produce a continuous strip of the foamed glass or ceramic, collectively referred to as foamed material, in an economical and convenient manner.

The problem is complicated by the fact that the foamed material is generally produced by combining with a glass or ceramic batch, usually in the form of a mixture of solids, one or more blowing or expanding agents which, as the mixture is heated to fusion, expands to provide pores, bubbles or interstices in the material.

The apparatus which can be used to produce such a foamed-material strip or block can include a tunnel-type furnace in which the glass or ceramic materials are heated to fusion and blown, a feeder for introducing the material at the beginning of a transport path through this furnace, i.e. at the upstream end thereof, a cooler at the downstream end and, if desired, means for separating the blocks from the strip.

The blocks themselves may be further cooled, tempered or the like.

In general, the ceramic or glass precursors, mixed with the blowing agent must be heated to a temperature of 800° C. to 900° C. to form the foamed strip which generally is in a plastic condition at such temperatures and must be cooled to rigidify it.

In a continuously operating apparatus for this purpose, it is convenient to be able to deposit the material to be foamed in successive molds disposed in end-to-end relationship and then foam the material at the indicated temperatures, whereupon the foamed glass or ceramic is cooled to a temperature of about 500° C. prior to or upon severing into individual blocks or bricks. The latter are subsequently cooled further.

Various prior art systems have been proposed which utilize such techniques or somewhat different ones. For example, in German patent document No. 13 01 009, two pairs of metal belts, moving horizontally and vertically define the molds in a muffle furnace to permit the expansion of the material, the expanded product being carried through the furnace between two belts.

An important disadvantage of this system is that the belts rub against the walls of the furnace which thus constrain the belts and must be lubricated to restrict wear.

The precooled strip of the foamed material is severed into blocks by a flying saw displaced transversely across the path of the foamed strip.

Notwithstanding the lubrication which is carried out in such systems, wear is still a significant problem and because lubrication is required in hot zones of the furnace, frequently the lubrication fails. Steel belts may become unusable because of these problems in muffle furnaces.

In another system, the material is foamed in sheet metal molds pushed through a muffle furnace in end-to-end relationship, the individual molds being filled with the foamable material being positioned in the furnace.

At the discharge end, the molds are subjected to a preliminary cooling, lowered and returned to the feed end. Here again the continuous strip of the foamed material can be cut into blocks which can be further cooled.

In this construction, the pushing force is applied from mold to mold directly and the retarding force of friction acts in the opposite direction. Experience has shown that the molds tend to deform and that the deformed molds form an irregular but continuous strip.

OBJECTS OF THE INVENTION

It is the principal object of the present invention to provide an improved apparatus for the production of foamed ceramic or glass objects, especially a foamed strip, in a continuous manner, whereby disadvantages of the prior art systems can be avoided.

Another object of this invention is to provide a method of operating an apparatus for producing a continuous strip of foamed glass or ceramic which avoids problems with friction and distortion of the molds and can be operated with high efficiency.

Still another object of the invention is to provide an apparatus of the type in which a continuous strip is formed in a succession of molds in end-to-end relationship, but the advance of the molds through the furnace does not require distortion-level pressures to be applied to the molds.

It is also an object of the invention to provide a system for making foamed ceramic or glass objects which minimizes wear of the molds and waste of the raw material or product.

SUMMARY OF THE INVENTION

These objects and others which will become apparent hereinafter are attained, in accordance with the present invention, in an apparatus for the production of a continuous strip of foamed ceramic or glass and which comprises a muffle or tunnel furnace defining a transport path for the strip and having an upstream or feed end and a downstream or discharge end, and a unique transport system cooperating with this furnace for carrying a succession of molds in end-to-end relationship therethrough.

According to the invention, each mold is made of at least two hingedly interconnected parts and is suspended from a trolley running on rails above the furnace upon hangers or rods which pass through a slot formed in the furnace roof and sealed by sand seals or the like cooperating with flanks, strips or like members on the hangers. The hingedly interconnected mold parts can be relatively swung away to open the mold downwardly at the downstream end thereof and permit the rail to lift the mold away from the continuous foamed strip which can pass continuously at a single level to the cooling zones of the apparatus.

According to a feature of the invention, the hangers or hanger for each mold carries an elongated spacer body, disposed outside the furnace, alignable and engageable with the spacers of the hangers of other molds to take up the pushing forces which are applied when the molds are displaced through the furnace. In practice, therefore, almost no longitudinal force is applied to the molds or the mold level by any pusher or like device for intermittently advancing the molds along the aforementioned path. The spacers are of a length approximately equal to that of the molds.

According to another feature of the invention, the path of the molds, prior to the release of the foamed strip, includes a precooling zone or station in which a preliminary cooling of the strip is carried out from, say, a temperature of about 800° C. or 900° C. to a temperature of about 500° C.

Means is provided beyond this downstream end for returning each of the molds and its trolley or carriage to the feed end of the furnace.

The hangers of the invention may be articulated to the molds and to the spacers and/or to the respective carriages, or can be flexible members to permit expansion and contraction of the molds to be compensated by hanger movement. This is important because the molds undergo cycles of significant heating and cooling.

If rigid hangers, fixedly secured to the molds and spacers are used, the spacers can have lengths in a cold state which can slightly exceed the length of the molds under these conditions, the two being dimensioned so that at the operating temperature of the furnace the lengths are approximately the same and any gap between successive molds is smaller than the particle size of the expandable material.

The molds of course define the cross-sectional shape of the body to be made and such molds can be of any desired cross section, e.g. rectangular or other polygonal shape, circular, oval, semicircular or like rounded or partly rounded and partly polygonal configuration.

According to yet another feature of the invention, a feeder is provided at the upstream end of the furnace and is reciprocatable in the direction of travel so as to advance the molds along the aforementioned path. To this end the feeder can be provided with a pusher bar or the like aligned with or engageable with the spacers so that the applied force is located at the spacers.

According to yet another feature of the invention, the feeder can comprise a hopper and a vibratory or conveyor-type feeder which can reach into one or more molds to deposit the foamable material therein. The vibratory conveyor is retracted as material is advanced into the mold, whereupon the feeder can be shifted further away to allow new molds to be swung into place. When the feeder is then advanced, the molds are forced into the furnace and along the path.

According to yet another feature of the invention, the spacers are channel-shaped and have legs disposed on top of the tunnel furnace to form the sealing means with the sand seals mentioned previously. This not only ensures a high stability spacer, but also allows the spacer to provide the twin functions of force-transmitting and sealing member.

According to an important feature of the invention, the relatively movable mold members are constructed so that a slit is formed centrally at the bottom extending in the longitudinal direction with two side walls of the mold being hinged symmetrically and provided with counterweights biasing these walls into a closed position. The apparatus is provided with a wedge to spread apart the walls and which can be disposed under the foamed strand to immediately support the latter. The opening movement may be continued beyond the wedge by lateral camming rails or rollers.

The advantage of this mold construction is that the hanger is loaded symmetrically and the mold height increases only to a limited extent during the opening operation.

According to another feature of the invention, the endless rail arrangement is provided with a return track which extends alongside the furnace and parallel to its longitudinal axis, being connected by a curved track which lies over the furnace.

The apparatus further includes a conveyor which can be operated continuously at a higher speed than the pusher and which can entrain the molds along the curved portions of the track and over the straight portion.

Means can be provided along the track between the point at which the molds leave the foamed strand and the entry to the furnace, for cleaning the interior of the molds, e.g. by spraying them out with a fluid. Preferably such cleaning means is located at the entrance to the return track.

According to still another feature of the invention, the forward stretch of track has a rising portion following the preliminary cooler and extending in the region in which the bottom of each mold is swung open. Since the mold is immediately lifted from the strand, the degree to which the mold must be swung open can be limited. The aforementioned conveyor can then engage the molds or their trolleys to swing them onto the return track.

BRIEF DESCRIPTION OF THE DRAWING

The above and other objects, features and advantages of the present invention will become more readily apparent from the following description, reference being made to the accompanying drawing in which:

FIG. 5 is a detail view showing the opening of the mold and corresponding to a view along the line V—V of FIG. 2; and FIG. 6 is a view similar to FIG. 5 but taken at a point further downstream.

SPECIFIC DESCRIPTION

Figure 1:
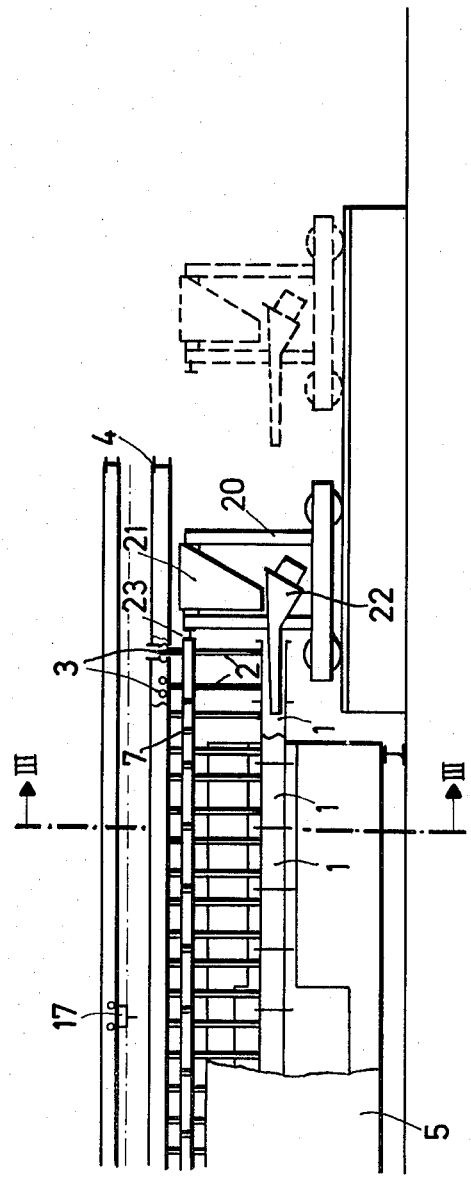
FIG. 1 is a diagrammatic elevational view of the inlet portion of a furnace showing the associated apparatus of the present invention and the pusher and feeder.

Each mold 1 is secured to a vertical hanger 2, which is secured to a trolley 3. The trolley 3 is guided on a rail track 4, which extends over the center line of a tunnel furnace 5.

The hanger 2 extends through a slot 6, which extends centrally in the top of the tunnel furnace 5. An inverted channel-shaped spacer 7 is secured to each hanger 2 and parallel to the longitudinal direction of the mold 1 and is approximately as long as the mold 1.

The two sand seals 8 are provided on top of the tunnel furnace 5 on opposite sides of the slot 6 and receive respective legs 9 of the channel-shaped spacer 7, whereby the slot 6 is sealed.

Figure 3:
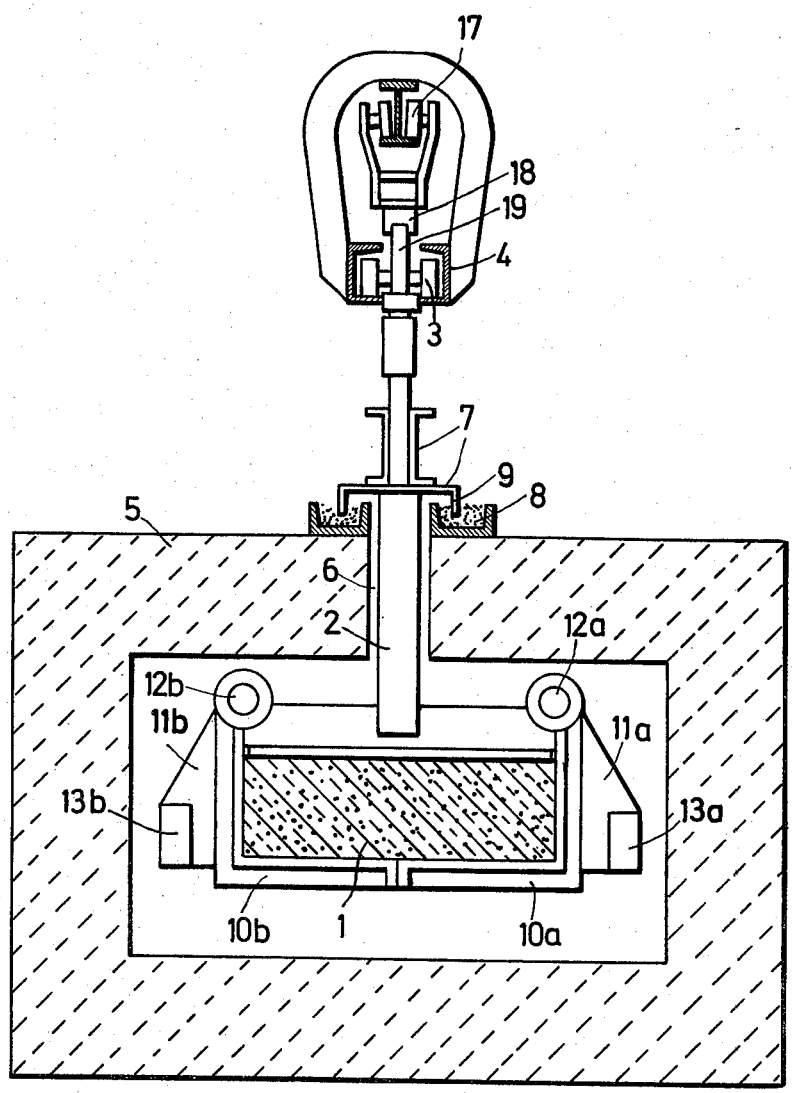
FIG. 3 is an enlarged cross-sectional view taken along the line III—III of FIG. 1.

The bottom of each mold 1 is split at the center and consists of two half-bottoms 10a and 10b (FIG. 3), which are connected to the side walls 11a and 11b and can be swung up laterally about hinges 12a and 12b.

The side walls 11a and 11b carry counterweights 13a and 13b, which bias the half-bottoms 10a and 10b toward their closed position.

After leaving the tunnel furnace 5 (FIG. 2), the molds 1 travel through a preliminary cooler 14, in which the strip of foamed glass 16 is cooled in the molds 1.

The half-bottoms 10a and 10b and the side walls 11a and 11b are swung up laterally behind the end of the preliminary cooler 14. This is first accomplished by means of a wedge, which constitutes the forward edge of the support 15 by which the strip 16 of foamed glass is supported when separated from the molds 1.

That wedge enters the parting line between the half-bottoms 10a and 10b and as it opens the latter immediately supports the strip of foamed glass 16. The opening of the molds 1 is then continued by means of lateral camming rails or rollers, by which the half-bottoms 10a and 10b and the side walls 11a and 11b are swung up further. The rail track rises at 4a from the point where the opening of the molds 1 begins. In that region the molds 1 are engaged by a conveyor 17, which revolves continuously at a velocity which exceeds the velocity at which the molds 1 are pushed forward in the tunnel furnace 5.

The conveyor 17 is a so-called power and free conveyor, which has a coupling element 18, which interengages with a retainer 19 provided on the trolley 3.

Figure 2:
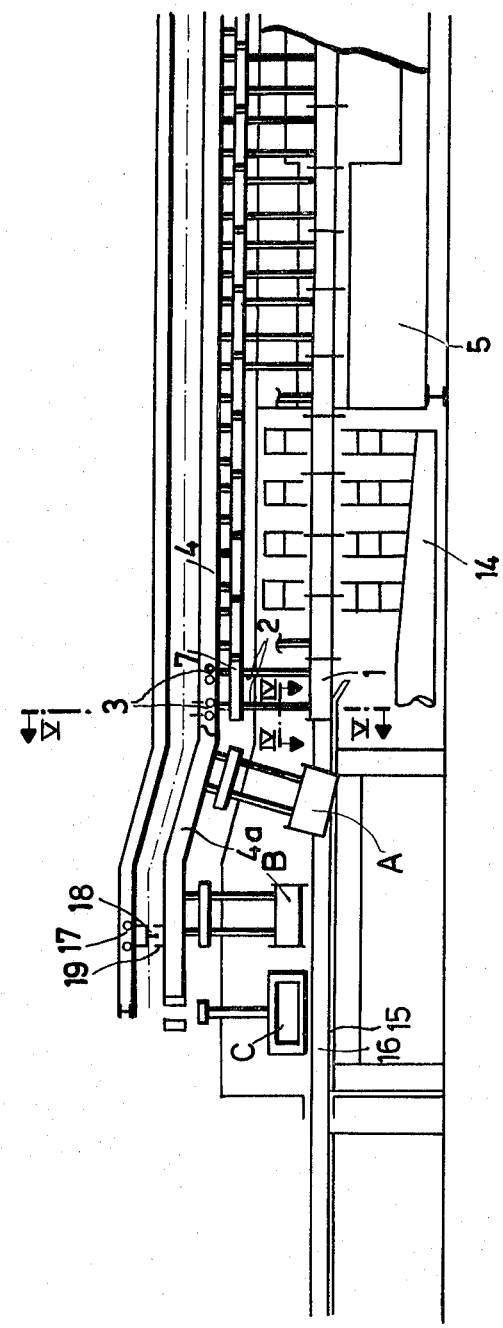
FIG. 2 is a similar elevational view of the opposite end of the apparatus.

When the mold 1 has been opened, it is pulled up to the position A shown in FIG. 2. The bottom is subsequently closed in position B, the mold is pulled into a curved rail in position C and is subsequently returned to the feed end.

Cleaning and spraying-out means are disposed at the entrance to the return track.

The feeder 20 is adapted to be advanced and retracted and comprises a chassis, which carries a bin 21 and a vibratory conveyor 22. As the feeder 20 is advanced, it serves also as a pusher and for this purpose is provided with a cross beam 23, which extends in the plane of the spacers 7 and engages the spacer 7 associated with the last mold 1 so that the series of molds 1 are intermittently pushed forward in the tunnel furnace 5.

As the feeder is retracted, the vibratory conveyor 22 is started to charge the last mold 1.

The advantages afforded by the invention reside in that the molds are hardly mechanically stressed while hot so that they will not be deformed, also, that the foamed strip has satisfactory properties, that there is only a small amount of waste and that the molds virtually do not degrade and can easily be separated from the foamed strip.

Figure 4:
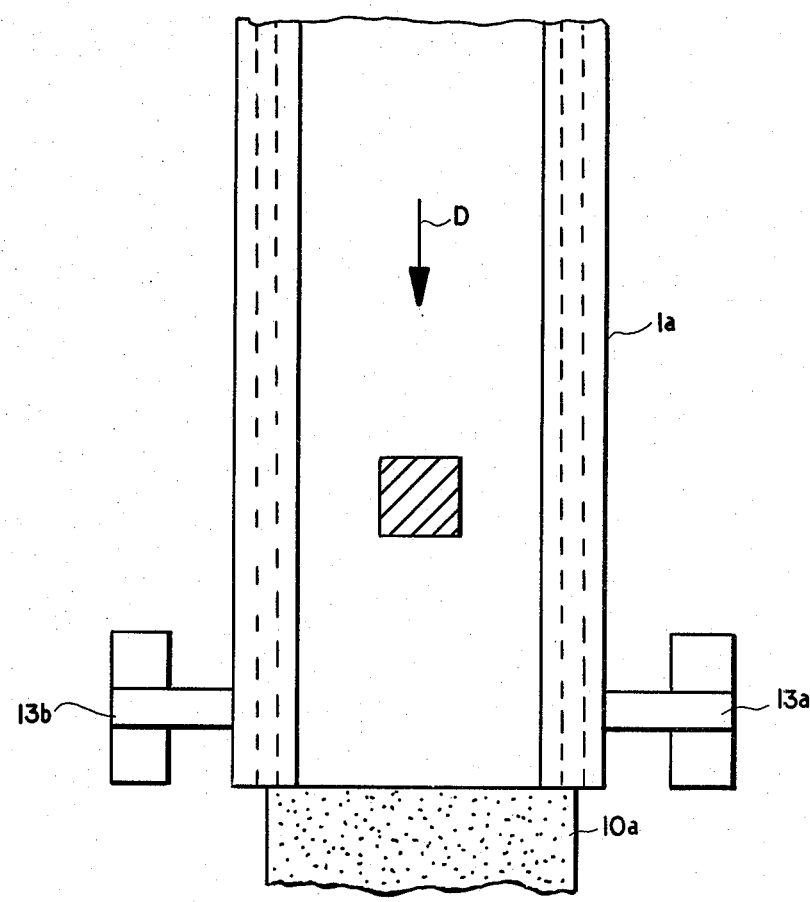
FIG. 4 is a plan view corresponding to a section along the line IV—IV of FIG. 2 but also in highly diagrammatic form.
Figure 4:
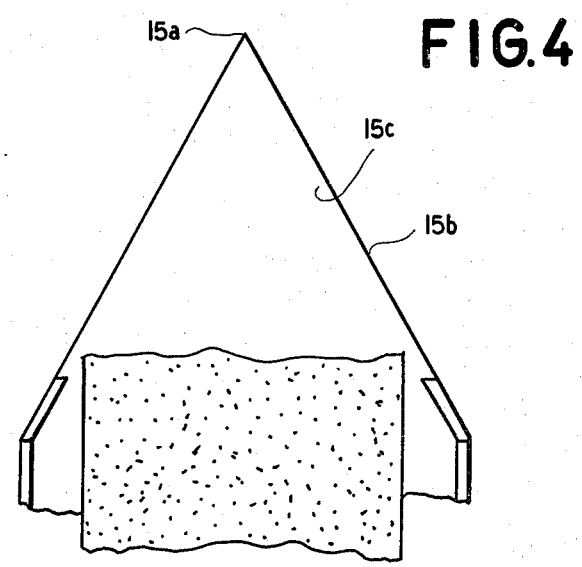

As can be seen from FIGS. 4 through 6, when a mold 1a encounters the tip 15a of a wedge 15b, the side walls 10a and 10b carrying the counterweights 13a are swung outwardly progressively with the movement of the mold in the direction of arrow D. During this opening movement, the stand 16a of the foamed glass or ceramic is immediately supported upon the surface 15c of the wedge and thereafter upon the surfaces 15d and 15e downstream thereof (see FIGS. 5 and 6). Initially the flanks of the wedge 15b spread the side walls 10a and 10b apart, whereupon these side walls are formed as rails 15f and 15g camming the side walls outwardly as the hangers 2a rise over the portion of the path corresponding to the track section 4a.

Once the side walls clear the strand the mold closes under the bias of the counterweights 13a and 13b.

I claim:

1. An apparatus for producing a shaped body of foamed glass or foamed ceramic from a foamable material, comprising:

a tunnel furnace adapted to heat said material to induce foaming and produce said body from said material;

a track having a stretch disposed above said furnace, said furnace having a slot extending below said track;

a plurality of openended molds adapted to receive said material and alignable in end-to-end substantially abutting relationship in said furnace, the bottom of each mold being laterally swingable to open downwardly;

a respective trolley assigned to each mold and riding on said track;

hanger means including at least one hanger suspending each mold from the respective trolley and extending through said slot;

respective spacers connected to each hanger means shaped from the respective molds and adapted to about one another upon alignment of said molds to limit the force transmitted from mold to mold;

a pusher adapted to displace said molds into said furnace at a feed end thereof and effective to apply force in line with said spacers;

means forming a moving seal between said hangers and said furnace to substantially block said slot;

means downstream of said furnace along said path for swinging said mold bottoms laterally to open the molds downwardly;

means along said path for effecting relative vertical separation of the molds and said strand to remove said strand from said molds through the bottoms thereof;

means for severing the strand removed from said molds into blocks; and means for returning molds from which said strand has been removed to said feed end of said furnace.

2. The apparatus defined in claim 1 wherein each of said molds is formed with at least two relatively movable parts hingedly connected together whereby said molds can be swung open at their respective bottoms, said track being formed with an ascending section connected to said stretch for lifting said molds upon the opening thereof, said ascending section forming said means for effecting relative vertical separation of said molds and said strand.

3. The apparatus defined in claim 2 wherein said pusher is provided with a feeder adapted to deposit said material in said molds upon retraction of said pusher from a pushing structure.

4. The apparatus defined in claim 2 wherein each of said spacers is channel-shaped and has a pair of legs extending downwardly into a sand trough to form said seal.

5. The apparatus defined in claim 2, claim 3 or claim 4 wherein each of said molds has a pair of side walls hinged to an upper portion of the respective mold and formed with a central longitudinal split, said means for swinging said mold bottoms laterally including a wedge for displacing said side walls outwardly to open the molds and immediately supporting the foamed object content therein.

6. The apparatus defined in claim 5, further comprising counterweights mounted on said side walls for biasing same in a mold closing direction.

7. The apparatus defined in claim 5 wherein said track includes a return stretch connected by curved strips to the first-mentioned stretch, further comprising a continuously operating conveyor having a speed greater than that of the pusher for displacing said molds along said return stretch.

8. The apparatus defined in claim 7, further comprising means for cleaning said molds disposed along the path thereof between said first-mentioned stretch and said return stretch.

* * * * *